United States Patent [19]
Gibson

[11] Patent Number: 5,872,522
[45] Date of Patent: *Feb. 16, 1999

[54] SELECTIVE CALL SYSTEM

[75] Inventor: Rodney W. Gibson, Haywards Heath, England

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 552,321

[22] Filed: Nov. 2, 1995

[30] Foreign Application Priority Data

Nov. 4, 1994 [GB] United Kingdom ............ 9422265

[51] Int. Cl.$^6$ .................................................. H04Q 7/00
[52] U.S. Cl. ........................ 340/825.44; 340/825.08; 340/825.54; 370/346; 370/350; 370/449; 375/200; 375/202; 375/317
[58] Field of Search ............... 340/825.44, 825.54, 340/825.08; 379/56, 57; 455/68, 70; 375/200, 202, 317, 203; 370/346, 350, 449

[56] References Cited

U.S. PATENT DOCUMENTS

| | | |
|---|---|---|
| 4,833,702 | 5/1989 | Shitara et al. .............. 379/60 |
| 4,882,579 | 11/1989 | Siwiak ................. 340/825.44 |
| 4,964,121 | 10/1990 | Moore .................... 370/100.1 |
| 4,968,966 | 11/1990 | Jasinski et al. ........ 340/825.44 |
| 5,265,119 | 11/1993 | Gilhousen et al. ............. 375/1 |

FOREIGN PATENT DOCUMENTS 9428685  12/1994  WIPO.

Primary Examiner—Michael Horabik
Assistant Examiner—Yonel Beaulieu
Attorney, Agent, or Firm—Jack D. Slobod

[57] ABSTRACT

A selective call system including a system controller, a base station transceiver and a plurality of secondary stations with receivers and low powered transmitters capable of sending spread spectrum signals. Invitations are issued to the secondary stations by the system controller at varying power levels. Only those secondary stations receiving the invitation signal are able to respond. Those secondary stations too far away cannot respond to a low power invitation, and since each secondary station can only respond once, upon a received invitation of increased power, such outer lying secondary stations can respond without interference from closer lying secondary stations.

16 Claims, 4 Drawing Sheets

SELECTIVE CALL SYSTEM

BACKGROUND OF THE INVENTION

1. Field of the Invention

The present invention relates to a selective call system, particularly but not exclusively, to a message transmission system in which long data messages and/or telescript are (or is) transmitted.

2. Description of the Related Art

PCT Patent Specification W094/28685 discloses a paging system which is suitable for sending long data messages at higher rates than is currently normally used and which is an enhancement of, and compatible with, the CCIR Radiopaging Code No 1 alternatively known as the POCSAG paging code. This enhanced paging system, known by the Applicant as the Advanced Paging Operators Code (APOC), has provision for sending address code words and concatenated message code words in cycles having a duration of 6.8 secs. Each cycle comprises a plurality of batches, for example 3 batches of equal duration. Each batch comprises a synchronisation (sync) code word concatenated with n frames, each of which is constituted by m code words.

When transmitting long data messages it is often desired to obtain an indication that a data message has been received successfully and better still to obtain a reply of some sort, however simple. The transmission of acknowledgements to paging messages has been disclosed in the art. In U.S. patent application Ser. No. 08/430518 filed Apr. 27, 1995 it is disclosed to transmit responses, that is acknowledgements/simple replies, as spread spectrum signals. By several pagers having different spreading code sequences, they can all respond simultaneously and each response can be recovered at the base station or paging system controller by multiplying the received signal with each of the respective spreading code sequences. The above-mentioned U.S. patent application Ser. No. 08/430518 also discloses allocating 6 unique spreading code sequences to all the message pagers allocated to the same frame of a batch, with each code sequence having a different meaning, such as:

Code Sequence 1—secondary station in the area for purposes of registration only.
Code Sequence 2—Received last message.
Code Sequence 3—Read message(s).
Code Sequence 4—Answer "Yes".
Code Sequence 5—Answer "No".
Code Sequence 6—Resend last message.

In operation when a system controller has sent a data message to a pager or secondary station, a microcontroller in the addressed secondary station will, if the message has been received and decoded successfully, multiply the reply pulse with, say, Code Sequence 2 and transmit the signal. As the system controller knows to which secondary station a data message has been sent, the protocol will allow a suitable time to elapse before transmitting a further message to that secondary station.

There are other cases where it is desired for a secondary station to send a signal, other than in response to a previous outgoing message, for example to register the presence of a pager in an area covered by a particular base station.

In a selective call system in which data messages are transmitted by a primary station to a secondary station which may roam relative to the primary station and which transmits responses as very low power spread spectrum signals, there is the near/far problem in which strong signals may suppress weak ones. This could mean that a signal which is received relatively weakly at a receiver associated with the system controller may be suppressed by a much stronger signal and in consequence is not detected.

OBJECTS AND SUMMARY OF THE INVENTION

It is an object of the present invention to facilitate the receipt of spread spectrum responses of significantly different received signal strengths.

According to one aspect of the present invention there is provided a communications system comprising a primary station having transmitting means and receiving means, means for formatting messages to be transmitted by the transmitting means, and one or more secondary stations, the or each secondary station having receiving means for receiving messages from the primary station and transmitting means for transmitting signals as spread spectrum signals, said receiving means in the primary station being adapted to receive and decode said spread spectrum signals, the primary station further comprising means for issuing invitations to the secondary stations to transmit their signals, said means selectively adjusting the power at which the invitations are transmitted, said power being adjustable between lower and upper limits, the receiving means in the or each secondary station having means for detecting the invitation signals and for initiating the transmission of a signal in response to the lower or lowest power level of the received invitation signals.

By means of the present invention, secondary stations are given a chance of having their signals heard irrespective of their distances from the receiver antenna and variations in propagation paths without the necessity of the secondary stations having either to embody specific signal strength measurement circuits or to vary the power of their transmissions. Irrespective of whether an in-bound signal is a response/acknowledgement or other message such as a registration message, it can only be sent following an invitation by a primary station.

According to a second aspect of the present invention there is provided a secondary station for use in the communications system in accordance with the first aspect of the invention, the secondary station comprising receiving means for receiving messages from the primary station and transmitting means for transmitting signals as spread spectrum signals in response to receiving an invitation from the primary station, the receiving means in the secondary station having means for detecting the invitation signals transmitted by a primary station and for initiating the transmission of a spread spectrum signal in response to the lower or lowest power level of the received invitation signals.

According to a third aspect of the present invention there is provided a primary station for use in the communications system in accordance with the first aspect of the present invention, the primary station comprising transmitting means and receiving means, means for formatting messages to be transmitted by the transmitting means, said receiving means being adapted to receive and decode spread spectrum signals, the primary station further comprising means for issuing invitations to secondary stations to transmit their signals as spread spectrum signals, said means selectively adjusting the power at which the invitations are transmitted, said power being adjustable between lower and upper limits.

According to a fourth aspect of the present invention there is provided a method of transmitting spread spectrum signals in a communications system comprising a primary station and a plurality of secondary stations, characterised by the primary station transmitting at least two invitation signals at different power output levels inviting those secondary stations which want to send a signal as a spread spectrum signal to transmit, and a secondary station on receipt of a first acceptable invitation signal, determining its transmission timing from the invitation signal.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
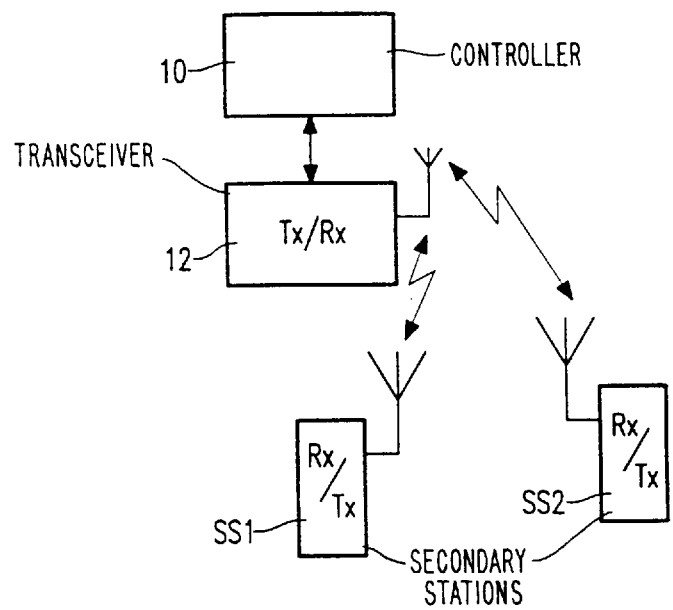
FIG. 1 is a diagram illustrating a selective call system for transmitting data messages.

Referring to FIG. 1, the paging system comprises a paging system controller 10 which is connected to at least one base station transceiver 12, if necessary by land lines or other suitable links. In the event of there being more than one base station transceiver they may be geographically spaced apart and may operate in a quasi-synchronous mode.

Selective call receivers or secondary stations SS1,SS2 are provided, each of which comprises a transceiver which is able to receive transmissions from the transceiver 12 and is able to transmit a limited number of types of messages, including acknowledgements, at significantly lower power than the output power of the transceiver 12, for example 30 dB lower. The messages are transmitted as spread spectrum signals typically at an information rate of one thousandth of that transmitted by the transceiver 12 and a spreading sequence length of the order of $10^4$, for example 8191 chips per bit.

In accordance with the present invention, the paging system controller 10 attempts to overcome the near/far problem by transmitting a set of invitation signals at a plurality of different power levels ranging between predetermined lower and upper limits, for example progressively increasing power levels, and secondary stations receiving the invitation signals respond to the invitation signal having the lower or lowest power and having responded do not reply to higher powered invitations in the same set which will be received by more distant secondary stations. The advantage of staggering the power levels of the invitation signals is that the strength of the replies at any one instant will be comparable thereby mitigating against the near/far problem which is overcome conventionally by applying power control to transmitters.

Figure 2:
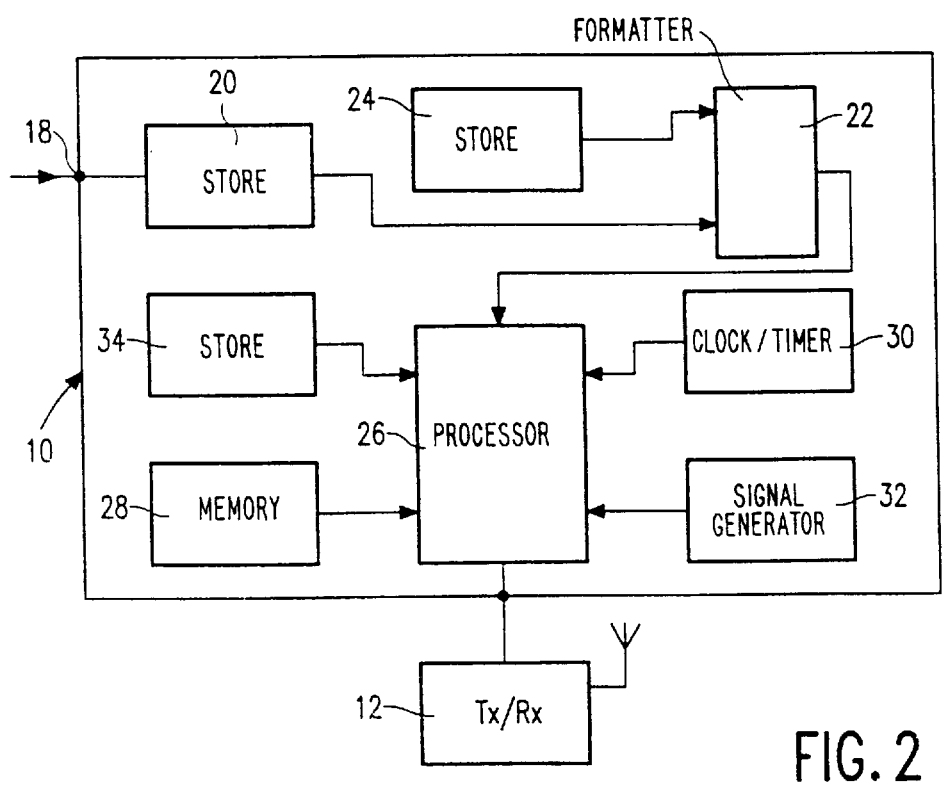
FIG. 2 is a block schematic diagram of a primary station comprising a system controller and a base station transceiver.

FIG. 2 shows an arrangement of a system controller 10 connected to the transceiver 12. The system controller 10 comprises an input 18 for data messages to be relayed via the transceiver 12. The messages are held in a store 20 from where they are relayed to a formatting stage which appends an address code word to the message and divides the message into a plurality of concatenated code words of a pre-determined length, each code word including error detection/correction bits and optionally an even parity bit. The address code words are held in a store 24. A processor 26 is provided which controls the operation of the system controller in accordance with a program which is stored in a memory 28. Also connected to the processor 26 are a clock/timer stage 30, an invitation signal generator 32 and a store 34 for storing details of the code sequences which may be used by the secondary stations in transmitting their responses to the invitation messages. Once the data messages in the store 20 have been formatted in the stage 22 the processor 26 causes them to be relayed by the base station transceiver 12. The formatting of the data messages may conform to any known message format such as APOC or POCSAG or to any other signal format which is known or yet to be devised. Once the messages have been transmitted, the processor arranges to transmit the invitation-to-respond signals generated in the stage 32. In one arrangement, after each transmission of an invitation signal at a progressively increasing power level, a time interval is provided in which a secondary station may respond. Once the time interval has elapsed then the invitation signal is repeated at increased power levels up to a maximum power level, each invitation being followed by a time period for reply.

The processor 26, following the transmission of an invitation signal, switches the transceiver 12 to receive and is ready to accept signals received by the transceiver 12, the outbound propagation path to the or each secondary station being substantially the same as that of the inbound propagation path. In order to identify a response which is sent as a spread spectrum signal, each of the code sequences is mixed sequentially with the received signals which are held in a buffer and when a correlation is obtained then the response is noted and further code sequences are mixed with the received signal in order to recover any other responses which may be present.

In another arrangement, the respective invitation signals are transmitted successively and a plurality of time slots are provided for receiving responses as spread spectrum signals, there being one time slot per power level. Optionally the response sequences may be divided into sub-sequences and the sub-sequences interleaved over a plurality of time slots in order to overcome the effects of any short term fading.

In a variant of the last mentioned arrangement, a plurality of sets of invitation signals are transmitted and a secondary station transmits a response to the lowest powered invitation signal received at a suitable moment following the transmission of the last set of invitation signals.

As a response lasts for substantially a second if it is transmitted as a single burst; this is long compared with typical fade rates. Thus if a secondary station is in a deep fade when it chooses its slot it may produce a signal at the receiver 20 dB above the planned strength for the slot. Since a fading signal often falls well below its average, but only goes about 3 dB stronger, it may be better to use a measure of the average signal strength in order to choose the slot. An indirect measure of the signal strength which avoids the need for dedicated circuitry is to deduce the average signal strength from the ordinals of the invitation signals received in the concatenated sets. However, it is necessary to optimise the time over which the average is determined because if too long is taken the average may be out of date when the response is transmitted.

Another effect of signal strength variation may be on the false rate. If the signal varies it will alter the correlations. For this reason it is necessary to choose codes having good short-term balance of ones and zeroes in the products. Thus fades will affect a roughly equal number of ones and zeroes.

Figure 3:
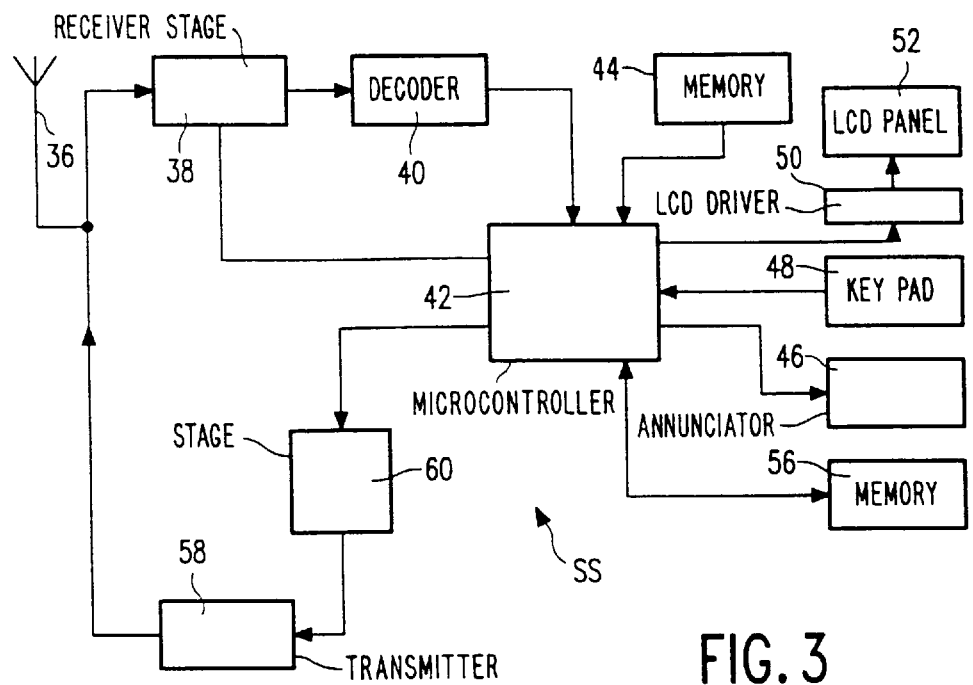
FIG. 3 is a block schematic diagram of a secondary station.

FIG. 3 is a block schematic diagram of a secondary station SS having the capability of transmitting responses to invitation signals as spread spectrum signals. The secondary station SS comprises an antenna 36 which is coupled to a receiver stage 38. An output of the receiver stage 38 is coupled to an input of a decoder 40. A microcontroller 42 is coupled to the output of the decoder 40 and controls the operation of the secondary station in accordance with a program held in a read only memory (ROM) 44. The microcontroller 42 has inputs/outputs, as appropriate, coupled to annunciating means 46 which may be audio, visual and/or tactile, a keypad 48, data output means, for example an LCD driver 50 which is coupled to an LCD panel 52, and a random access memory (RAM) 56 for storing any messages which have been received and decoded.

In operation the receiver stage 38 is energised in response to the particular battery economising protocol followed by the secondary station SS. Optionally the decoder 40 and the microcontroller 42 may "sleep" when not required, the microcontroller 42 being woken by an internal timer (not shown) or an interrupt signal and in so doing waking up other stages of the secondary station, as appropriate. When an address code word is received, it is demodulated, decoded, error corrected and checked to see if it is one assigned to the secondary station or an invitation to send a message to the primary station. Assuming it is an address code word assigned to the secondary station then depending on the programming of the microcontroller 42, the annunciating means 46 may be activated to inform the user that a call has been received. However a user by actuating a key or keys of the keypad 48 can inhibit one or more of the output devices of the annunciating means. If a short message at the same data rate as the address code word is concatenated with the paging call then once it has been decoded and error checked/corrected, the microcontroller 42 causes the decoded message to be stored in the RAM 56. By actuating a key or keys of the keypad 48, a user can instruct the microcontroller 42 to read-out the message from the RAM 56 to the LCD driver 50 which will cause the message to be displayed on the screen 52. The operation described so far is typical for many alphanumeric message pagers conforming to the POCSAG standard.

The illustrated secondary station SS includes a low power transmitter 58 whereby acknowledgements and/or short messages can be relayed to the or any in-range base station transceiver. The actual acknowledgement or message is generated by the microcontroller 42 and will be transmitted as a spread spectrum signal. One or more near orthogonal pseudo-random code sequences may be stored or generated in a stage 60. The microcontroller 42 controls the reading out of a code sequence from the stage 60 which is coupled to a transmitter 58. The code sequence may be one of a set of near orthogonal sequences or a time shifted version of such a sequence. The chosen sequence may represent the identity of the secondary station and/or the number of a message received and/or coded reply as shown below.

Code Sequence 1—secondary station in the area for the purposes of registration only.
Code Sequence 2—Received last message.
Code Sequence 3—Read message(s).
Code Sequence 4—Answer "Yes".
Code Sequence 5—Answer "No".
Code Sequence 6—Resend last message.

As an alternative to allocating sets of predetermined code sequences to secondary stations allocated to respective frames, the paging system controller and the secondary stations may each store the same block of code sequences, say 1000 code sequences. When a data message is to be transmitted to an addressed secondary station the system controller anticipates that one of say 20 possible answers may been possible and the overall transmission of the data message includes an indication that twenty of the 1000 possible code sequences have been allocated dynamically to the secondary station for use in transmitting its answer, each code sequence representing one of twenty possible answers. Once a response to an invitation signal has been received and relayed to the system controller it is compared with each of the twenty dynamically allocated code sequences and the code sequence which achieves the best correlation is deemed to give the answer to the message. Once the answer has been determined the allocation of the twenty code sequences for an answer from that secondary station is withdrawn.

In a practical situation strings of messages are transmitted sequentially to different secondary stations and in those cases where answers are required, the number of possible answers may vary,consequently the number of code sequences from the batch of, say 1000, possible code sequences allocated by the system controller for an answer from a particular secondary station will vary accordingly. However as stated above the allocation is temporary.

Figure 4:
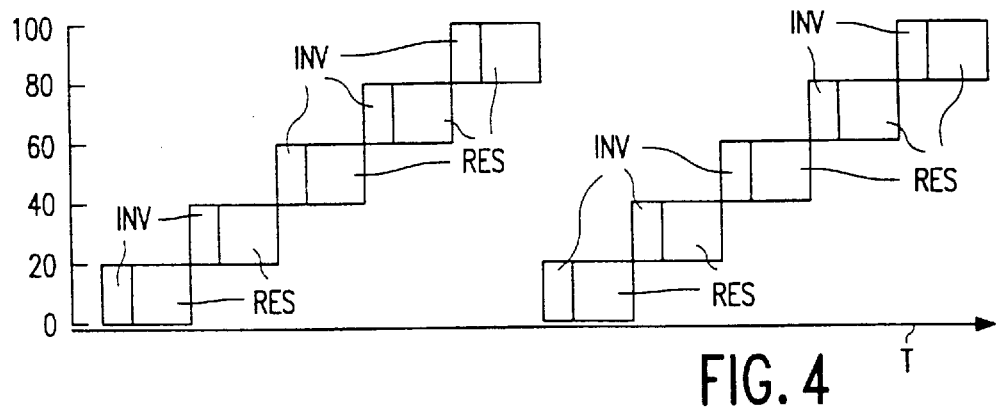
FIG. 4 is a diagram illustrating the primary station transmitting invitations at equalling increasing increments of output power.
Figure 5:
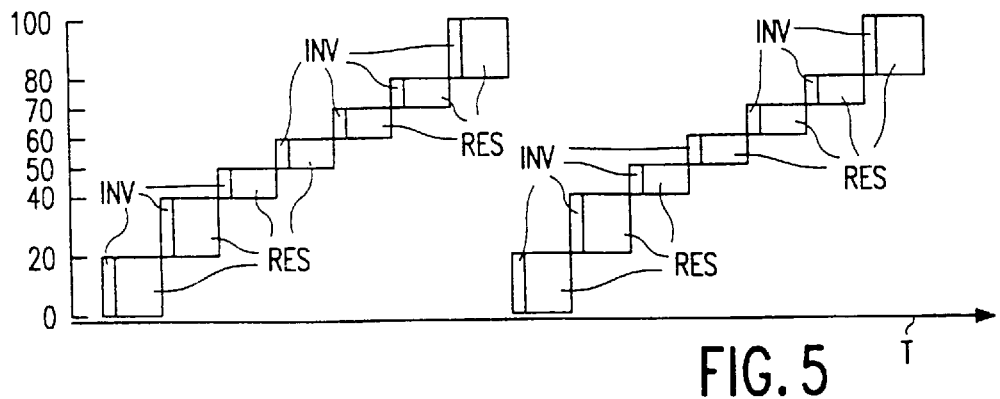
FIG. 5 is a diagram illustrating the primary station transmitting invitations at non-equal increments of output power.

In order to avoid the near/far problem which occurs when receiving several spread spectrum signals at different power levels, the paging system controller 10 causes the base station transceiver 12 to transmit invitation signals at different power levels, for example progressively increasing or decreasing power levels, for example at evenly separated levels as shown in FIG. 4 or unequally separated levels as shown in FIG. 5. In the case of FIG. 5, the size of the steps may be determined beforehand or altered dynamically in operation in order to influence the number of responses transmitted after each invitation signal.

Each of the slots shown in FIGS. 4 and 5 comprises two parts, an invitation part INV and a response part RES. During the latter part the base station transceiver 12 switches over to receive.

Figure 6:
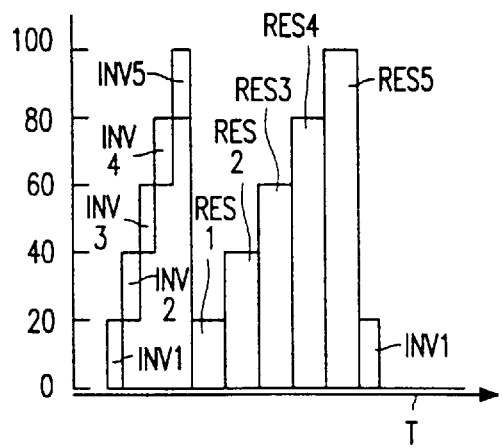
FIG. 6 is a diagram illustrating the primary station transmitting a sequence of invitation signals at progressively increasing power levels which is followed by a number of time slots in which response signals can be transmitted.

Alternatively in FIG. 6 the invitations INV1 to INV5 are transmitted sequentially at increasing power levels and a corresponding number of slots RES1 to RES5 are provided to receive responses corresponding to each power level.

The microcontroller 42 in each secondary station SS stores the fact that it has transmitted a response on receipt of the lowest power invitation signal and in so doing the secondary station is inhibited from responding to higher powered invitation signals.

Figure 7:
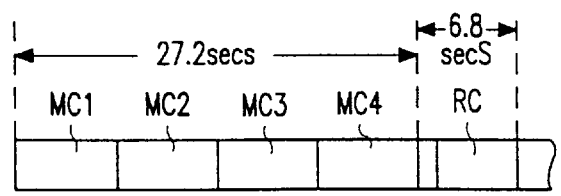
FIGS. 7 to 9 are time charts illustrating an embodiment of the invention in which invitation signals are transmitted in concatenated batches followed by a number of time slots for the secondary stations to transmit their spread spectrum signals.
Figure 8:
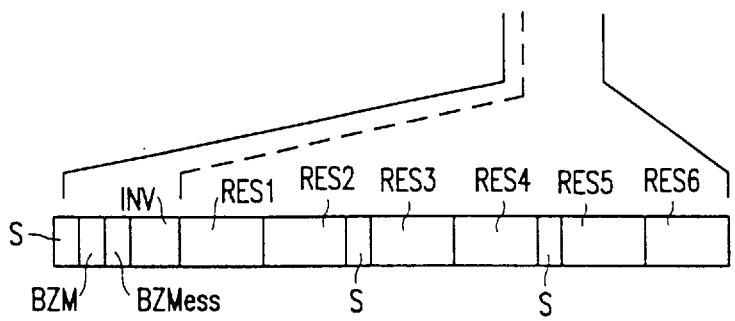
Figure 9:
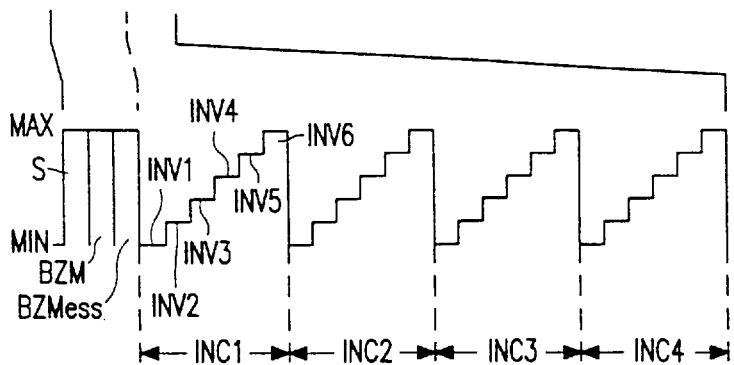

FIGS. 7, 8 and 9 illustrate another arrangement in which four cycles of messages (4×6.8 seconds) MC1 to MC4 (FIG. 7) corresponding to the transmission of one thousand high rate messages are followed by one cycle RC (6.8 seconds) in which four sequences of invitations signals INC1 to INC4 are transmitted which are followed by six reply slots RES1 to RES6, each of the approximate duration of 1 second, for acknowledgements, responses and/or registrations from the secondary stations.

As shown in FIG. 8 the reply cycle RC begins with a transmission at full power of a sync code word S which is followed by a Batch Zero Marker BZM constituted by a non-allocated address code word and a Batch Zero Message BZMess which indicates that invitation signals are to follow and at different power levels four sequences of invitation signals INC1 to INC4. Each sequence comprises six invitations INV1 to INV6 of increasing power levels (FIG. 9) from a predetermined minimum level MIN to a predetermined maximum level MAX. A secondary station wishing to transmit a signal in response to the invitation signals, identifies which of the invitation steps INV1 to INV6 that it received had the lowest power or lowest average power and under the control of the microcontroller 42 (FIG. 3) transmits its message in the appropriate one of the response slots RES1 TO RES6.

Figure 10:
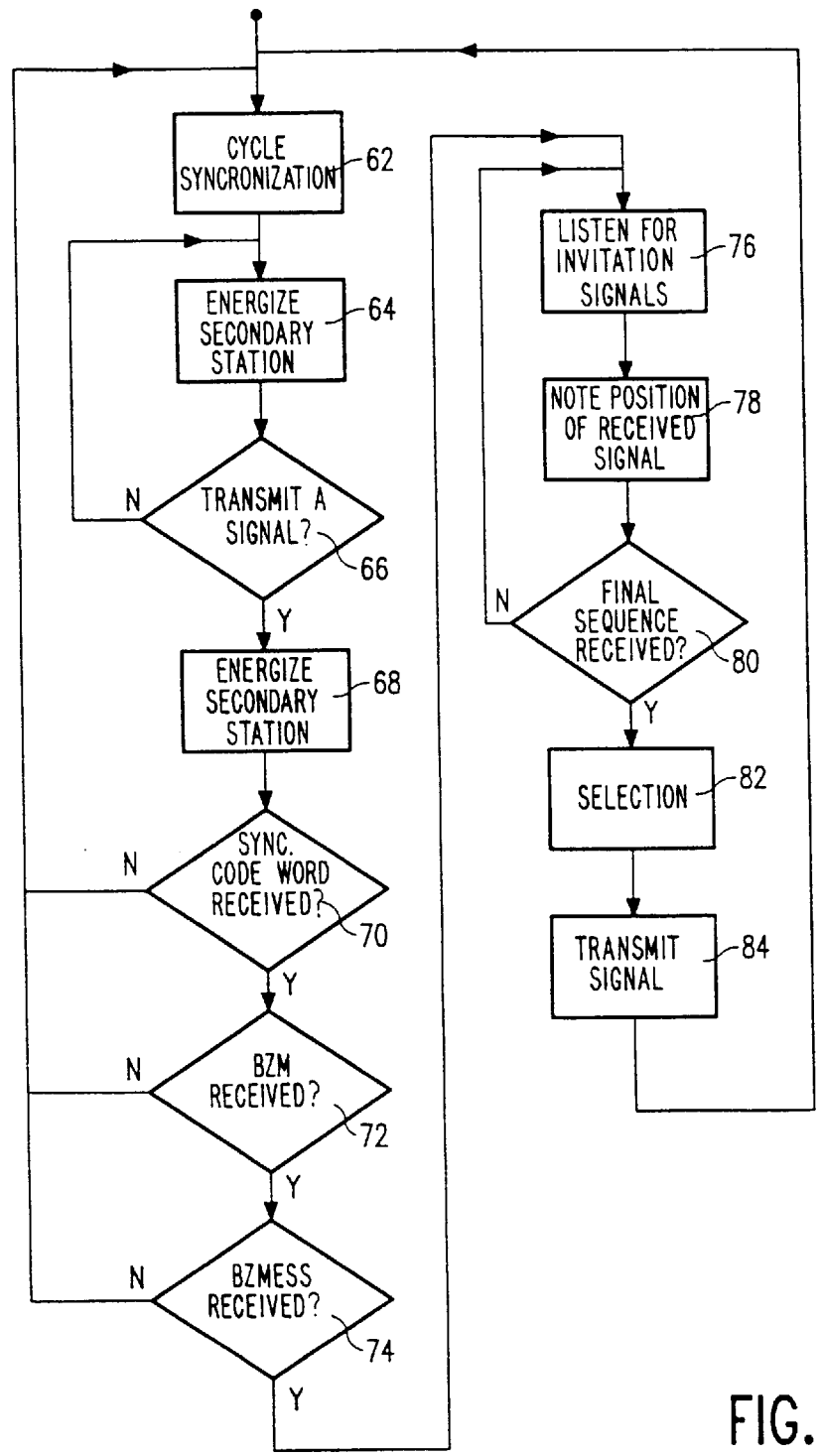
FIG. 10 is a flow chart relating to the operations of the secondary station when operating in accordance with the embodiment shown in FIGS. 7 to 9.

FIG. 10 is a flow chart illustrating the cycle of operations involved when sending concatenated sequences of invitations followed by a plurality of response time slots RES1 to RES6 (FIG. 8). The flow chart commences at block 62 which indicates the secondary station achieving cycle synchronisation. In block 64 the secondary station is energised in accordance with the battery saving protocol prevailing, say to receive sync code word and Batch Zero Marker at the beginning of each cycle and for the duration of at least one predetermined frame. Block 66 relates to the secondary station determining whether it needs to transmit a signal. If the answer is No (N) the flow chart reverts to the block 64. However, if the answer is Yes (Y), the secondary station is energised at the commencement of the reply cycle RC1 (FIG. 7), block 68. In block 70, a check is made to see if the sync code word, transmitted at maximum power level, has been received, if the answer is No (N) the secondary station powers down and reverts to the block 62. If the answer is Yes (Y), then in block 72 a check is made to see if the Batch Zero Marker BZM, transmitted at maximum power level, has been received. If the answer is No (N) the flow chart reverts to the block 62 whereas if the answer is Yes (Y) the flow chart proceeds to the block 74. In the block 74 a check is made to see if the Batch Zero Message BZMess, transmitted at maximum power level, has been received, if the answer is No (N) the flow chart reverts to the block 62 whereas if the answer is Yes (Y) the flow chart proceeds to the block 76 which relates to the operation of the secondary station listening for invitation signals. In block 78, the ordinal or relative position of the weaker or weakest invitation signal in the sequence of those invitation signals received is noted. In the block 80 a check is made if the fourth (or final) sequence has been received. If the answer is No (N) the flow chart reverts to the block 76 but if the answer is Yes (Y) the flow chart proceeds to the block 82 in which the ordinal of the lowest powered invitation signal as received is selected. In the example illustrated this would be the invitation signal closest to the beginning of its respective sequence. In block 84, the secondary station transmits its spread spectrum signal in that one of the response slots RES1 to RES6 corresponding to the ordinal selected in the block 82. Thereafter the flow chart reverts to the block 62.

Although the system shown in FIG. 1 has been described with reference to a selective call system, it may be used in other applications such as telemetry in which the stations SS1 and SS2 are remote stations which may be monitoring reservoir levels and the operation of pumps and valves in a water supply installation. Using the teaching of the present invention it is possible to alter the installation, perhaps temporarily by adding remote stations, without affecting the operation of the communications system.

In the embodiments of the present invention described with reference to and illustrated in FIGS. 4, 5, 6 and 8, the duration of all the response time slots RES has been made equal. However, since when implementing the present invention the spread spectrum signals are ordered into time slots in accordance with their signal strength, it is possible to use shorter time slots for the strong spread spectrum signals because they would have a higher signal to noise ratio. In an alternative arrangement, equal duration time slots are maintained and the power levels are adjusted somewhat as indicated in FIG. 5 to load more users into the "strong" slots. In the event of implementing the variable duration slot arrangement, the secondary stations will adjust the duration of their transmissions accordingly. The microcontroller 42 may be preprogrammed with the required details to generate shorter duration signals in response to stronger invitation signals and vice versa.

The Batch Zero Message may not only indicate that invitation signals are to follow but also may include various parameters or instructions such as: number of time slots, slot durations, if variable, classes and sub-groups to respond at a particular time.

From reading the present disclosure, other modifications will be apparent to persons skilled in the art. Such modifications may involve other features which are already known in the design, manufacture and use of communications systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A communications system comprising a primary station having means for formatting messages and transmitting means for transmitting said formatted messages, and at least one secondary station having receiving means for receiving messages from the primary station and transmitting means for transmitting spread spectrum signals to the primary station;

said primary station having receiving means for receiving and decoding said spread spectrum signals and invitation signal issuing means for issuing a sequence of invitation signals to the secondary stations which authorize the secondary stations to transmit their respective signals to said primary station during different respective preset time intervals of a plurality of preset time intervals in one to one correspondence with the respective invitation signals of the sequence;

said invitation signal issuing means being selectively adjustable so that the power at which the invitation signals are transmitted from said primary station to each of said secondary stations is varied from one invitation signal to the next during the sequence in increments between a lower and an upper limit;

the receiving means in each respective secondary station having detecting means for detecting invitation signals and for initiating the transmission of a spread spectrum signal to said primary station in response to and during the preset time interval corresponding to only the invitation signal having the lowest power level of the invitation signals of the sequence received by said secondary station.

2. The communications system as claimed in claim 1, wherein said invitation issuing means adjusts the power level of the invitation signals during the sequence in equal increments between said lower and upper limits.

3. The communications system as claimed in claim 1, wherein said invitation issuing means includes means for determining the distribution of the spread spectrum signals and for adjusting the size of the increments in the power level of the invitation signals to influence the distribution of the spread spectrum signals.

4. The communications system as claimed in claim 1, wherein the size of the increments in the power level of the invitation signals is unequal.

5. The communications system as claimed in claim 1, wherein the duration of a spread spectrum signal transmitted in response to a relatively strong invitation signal is different from that transmitted in response to a relatively weak invitation signal.

6. The communication system as claimed in claim 1, wherein the transmitting means in the primary station is arranged to transmit invitation signals in first time slots and second time slots are provided between the first time slots for the transmission, in response to invitation signals, of spread spectrum signals by one or more of the secondary stations.

7. The communications system as claimed in claim 6, wherein the first and second time slots alternate with each other.

8. The communications system as claimed in claim 6, wherein the first and second time slots are arranged in alternate groups.

9. The communications system as claimed in claim 1, wherein the invitation signals are arranged in sets, and in that two or more sets are concatenated and are followed by a time period in which spread spectrum signals are transmitted.

10. The communications system as claimed in claim 8, wherein the spread spectrum signals are interleaved over a plurality of the second time slots.

11. The communications system as claimed in claim 6, wherein the detecting means for detecting invitation signals received by a secondary station includes means for determining the average signal strength of invitation signals received in the first time slots and means which, when the determined average signal strength exceeds an internally set threshold, causes the transmitting means of said secondary station to transmit a response.

12. A secondary station for use in a communications system having a primary station which includes invitation signal issuing means for issuing a sequence of invitation signals to the secondary station which authorize it to transmit its respective signal to said primary station during a respective preset interval of a plurality of different preset time intervals in one to one correspondence with the invitation signals of the sequence, said invitation issuing means being selectively adjustable so that the power at which the invitation signals are transmitted from said primary station to said secondary station is varied from each invitation signal to the next of the sequence in increments between a lower and an upper limit; said secondary station comprising:

detecting means for detecting the invitation signals; and initiating means for initiating transmission of a spread spectrum signal to said primary station in response to and during the preset time period corresponding to only the invitation signal having the lowest power level of the invitation signals received by the secondary station.

13. A primary station for use in a communication system having at least one secondary station with detecting means for detecting invitation signals of a sequence of invitation sianals transmitted by said primary station which authorize initiation of a spread spectrum signal during respective different preset time intervals in one to one correspondence with the invitation signals of the sequence, and initiating means for initiating the transmission of a spread spectrum signal to said primary station in response to and during a preset time interval corresponding to only the invitation signal having the lowest power level of the invitation signals received by the secondary station, said primary station comprising:

means for formatting messages and transmitting said formatted messages;

receiving means for receiving and decoding spread spectrum signals transmitted by a secondary station; and invitation signal issuing means for issuing said sequence of invitation signals to a secondary station which authorize it to transmit its respective spread spectrum signal to said primary station in the different preset time slots in one to one correspondence with the invitation signals of the sequence, said invitation signal issuing means being selectively adjustable so that the power at which the invitation signals are transmitted from said primary station to each secondary station is varied from one invitation signal to the next during the sequence in increments between a lower and an upper limit.

14. The primary station as claimed in claim 13, wherein said means for issuing invitation signals adjust the power level thereof in equal increments between said lower and upper limits.

15. The primary station as claimed in claim 13, wherein said means for issuing invitation signals includes means for determining the distribution of spread spectrum signals received from secondary stations and for adjusting the size of the increments in the power level of the invitation signals so as to influence the distribution of the spread spectrum signals.

16. The primary station as claimed in claim 13, wherein the size of the increments in the power level of the invitation signals is unequal.

* * * * *